US008881718B2

(12) United States Patent
Parrish et al.

(10) Patent No.: US 8,881,718 B2
(45) Date of Patent: Nov. 11, 2014

(54) FUEL-FIRED COMBUSTOR

(75) Inventors: Tony Parrish, Columbus, IN (US); Samuel N. Crane, Jr., Columbus, IN (US); Wilbur H. Crawley, II, Nashville, IN (US)

(73) Assignee: Faurecia Emissions Control Technologies USA, LLC, Columbus, IN (US)

( * ) Notice: Subject to any disclaimer, the term of this patent is extended or adjusted under 35 U.S.C. 154(b) by 1006 days.

(21) Appl. No.: 12/849,839

(22) Filed: Aug. 4, 2010

(65) Prior Publication Data

US 2011/0047979 A1 Mar. 3, 2011

Related U.S. Application Data

(60) Provisional application No. 61/237,337, filed on Aug. 27, 2009.

(51) Int. Cl.
*F01N 9/00* (2006.01)
*F01N 3/025* (2006.01)

(52) U.S. Cl.
CPC ............ *F01N 3/025* (2013.01); *F01N 2240/14* (2013.01); *Y02T 10/47* (2013.01); *F01N 9/002* (2013.01)
USPC ................ 126/239; 431/18; 431/13; 431/14; 126/19.5

(58) Field of Classification Search
USPC ....................... 126/239, 19.5; 431/18, 13, 14
See application file for complete search history.

(56) References Cited

U.S. PATENT DOCUMENTS

| | | | | |
|---|---|---|---|---|
| 3,504,993 | A * | 4/1970 | Cade | 431/26 |
| 4,462,376 | A * | 7/1984 | Ripper et al. | 123/676 |
| 4,782,766 | A * | 11/1988 | Lee et al. | 110/190 |
| 6,918,755 | B1 | 7/2005 | Johnson et al. | |
| 7,117,662 | B2 * | 10/2006 | Hirayama et al. | 60/39.27 |
| 7,685,811 | B2 | 3/2010 | Taylor, III et al. | |
| 2004/0224269 | A1 * | 11/2004 | Reifel et al. | 431/11 |
| 2005/0150211 | A1 | 7/2005 | Crawley et al. | |
| 2005/0150217 | A1 | 7/2005 | Crawley et al. | |
| 2008/0087013 | A1 | 4/2008 | Crawley et al. | |
| 2009/0178389 | A1 | 7/2009 | Crane, Jr. | |
| 2009/0178394 | A1 | 7/2009 | Crane, Jr. | |
| 2009/0180937 | A1 | 7/2009 | Nohl et al. | |
| 2010/0181138 | A1 | 7/2010 | Khadiya et al. | |

* cited by examiner

*Primary Examiner* — Avinash Savani
(74) *Attorney, Agent, or Firm* — Carlson, Gaskey & Olds, PC

(57) ABSTRACT

A fuel-fired combustor includes a housing with a combustion chamber. The housing has an inlet and an outlet. A fuel inlet to the housing supplies fuel to the combustion chamber. An igniter ignites a mixture of exhaust gas and fuel to produce a flame for increasing an internal temperature. At least one sensor measures or monitors at least one combustor characteristic and generates a corresponding combustor characteristic signal. A controller receives the combustor characteristic signal, compares the combustor characteristic signal to a predetermined combustor criteria and generates an output signal to change at least one combustor operating condition if the combustor characteristic signal varies from the predetermined combustor criteria.

22 Claims, 2 Drawing Sheets

FUEL-FIRED COMBUSTOR

RELATED APPLICATION

This application claims priority to U.S. Provisional Application No. 61/237,337, which was filed Aug. 27, 2009.

TECHNICAL FIELD

This invention generally relates to a fuel-fired combustor for a vehicle exhaust system.

BACKGROUND OF THE INVENTION

Fuel-fired burners or combustors can be used to regenerate particulate filters in soot abatement assemblies. The fuel fired combustor includes a combustion chamber that receives at least a portion of exhaust gas flow from a vehicle engine, a fuel inlet, an air inlet, and an igniter. During vehicle operation, soot accumulates on the particulate filter. As soot accumulation increases, the operating efficiency of the vehicle engine can be adversely affected. Once the amount of soot in the particulate filter reaches a certain level, the igniter is used to ignite a fuel/air/exhaust gas mixture forming a flame that increases the temperature to a set-point such that the soot can be burned off resulting in regeneration of the filter.

Once the flame is detected in a fuel-fired combustor, it is important to ensure that the flame is maintained during the entire fueling cycle. If the flame is extinguished unexpectedly, there could be significant gaseous emissions emitted by the combustor.

Further, if an inlet pipe into the fuel-fired combustor breaks or detaches from the combustor, an uncontrolled flame could be exposed to the ambient environment. If the fuel-fired combustor fails such that the flame from combustion is exposed, damage to the surrounding components could occur.

Once the ignition phase of the fuel-fired combustor is complete and the flame is present, it is important for a control system to begin the next stage of fueling by ramping the temperature up to the set-point. If the fuel rate is too low, the flame may be extinguished, and if the rate is too high, there may be increased levels of emissions and downstream components may overheat.

The temperature of the fuel supplied to the combustor is directly related to a size of the fuel droplets when the fuel is atomized. The colder the fuel is, the bigger the droplets are. Bigger droplets are more difficult to ignite than smaller droplets. Further, the colder the exhaust gas is flowing into the combustor, the more fuel it takes to achieve the same set-point temperature.

SUMMARY OF THE INVENTION

A fuel-fired combustor includes at least one sensor that measures or monitors at least one combustor characteristic and generates a corresponding combustor characteristic signal. A controller receives the combustor characteristic signal, compares the combustor characteristic signal to a predetermined combustor criteria and generates an output signal to change at least one combustor operating condition if the combustor characteristic signal varies from the predetermined combustor criteria.

In one example, the fuel-fired combustor includes a housing defining an internal cavity and having an inlet and an outlet. A combustion chamber is positioned within the internal cavity. An inlet pipe is connected to the inlet of the housing to direct exhaust gas flow into the internal cavity. A fuel inlet supplies fuel to the combustion chamber and an air inlet supplies air to mix with the fuel within the combustion chamber. An igniter is operable to ignite an air-fuel mixture to produce a flame for increasing an internal temperature within the housing.

In one example, the sensor is a temperature sensor that measures a temperature of exhaust gas flow near the inlet pipe and the combustor characteristic signal comprises an inlet exhaust gas temperature. The predetermined combustor criteria comprises a normal operating temperature, and when the inlet exhaust gas temperature exceeds the normal operating temperature an indication of a malfunctioning inlet pipe is determined, and the controller generates the output signal to deactivate the combustor.

In one example, the sensor is mounted external to the housing and is a flame detection sensor that detects when the flame is exposed to an ambient environment. The combustor characteristic signal comprises an absence or presence of an exposed flame. The predetermined combustor criteria comprises an exposed flame, and when the combustor characteristic signal comprises the presence of an exposed flame the controller generates the output signal to deactivate the combustor.

In one example, the sensor is a fuel flow rate sensor and the combustor characteristic signal comprises a fuel flow rate. The predetermined combustor criteria is a fuel flow range defined between a minimum allowable fuel flow rate and a maximum allowable fuel flow rate. Once a presence of the flame is identified, the controller sets the fuel flow rate at a value within the fuel flow range dependent upon a current engine operating condition.

In one example, the sensor is an ambient temperature sensor, the combustor characteristic signal comprises an ambient temperature, and the predetermined combustor criteria comprises a nominal temperature. The controller provides open-loop fueling by increasing fuel flow as the ambient temperature decreases below the nominal temperature and the controller does not adjust fuel flow when the ambient temperature is at the nominal temperature.

In one example, the sensor is a temperature sensor that measures a temperature of the flame and the predetermined combustor criteria comprises a maximum temperature measured while the combustor is deactivated. The controller identifies a presence of the flame when the temperatures sensor measures a temperature that exceeds the predetermined combustor criteria.

These and other features of the present invention can be best understood from the following specification and drawings, the following of which is a brief description.

DETAILED DESCRIPTION OF THE PREFERRED EMBODIMENT

Figure 1:
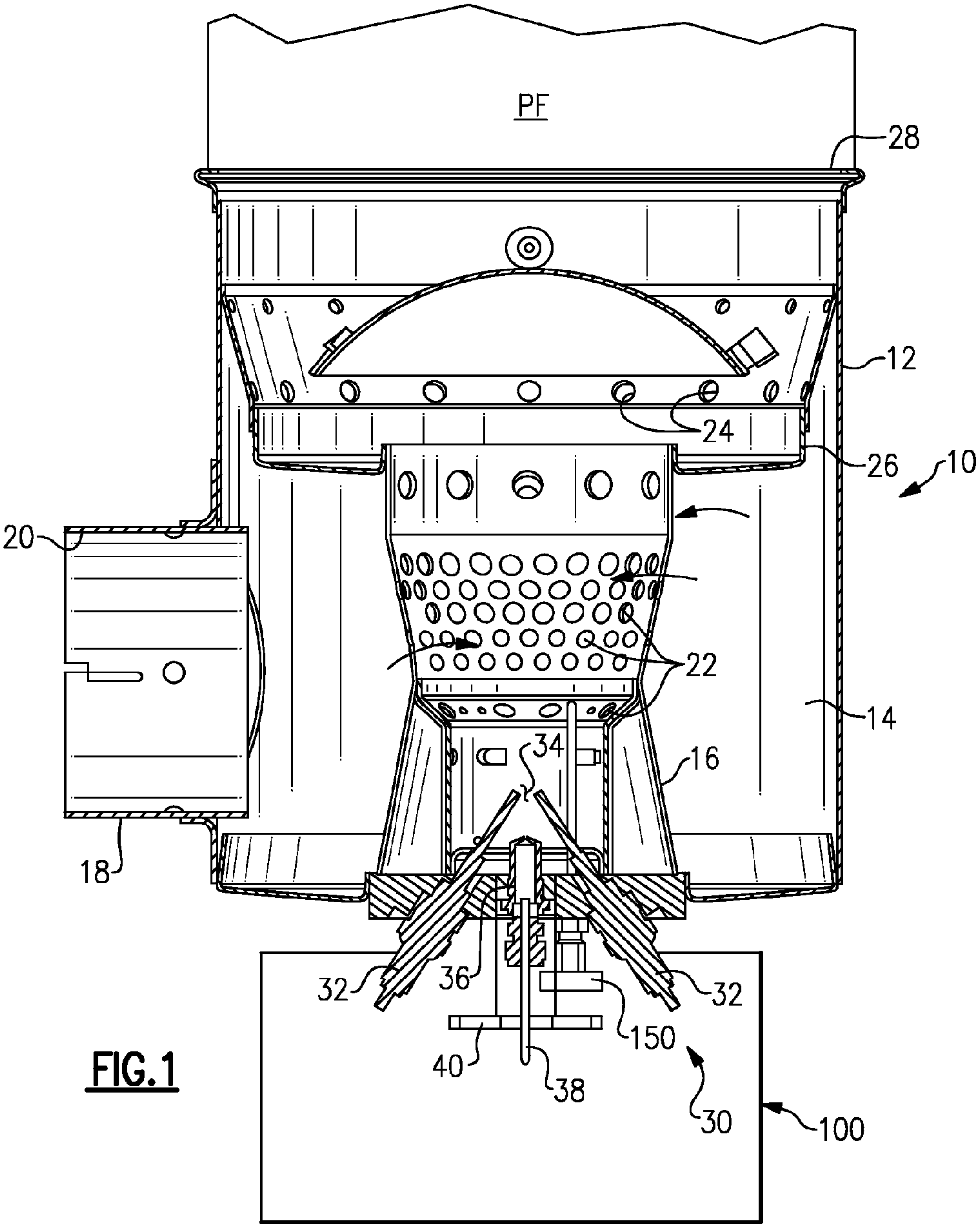
FIG. 1 shows a schematic view of a fuel-fired combustor with a control system.

A fuel-fired combustor 10 with a control system 100 is shown in FIG. 1. The fuel-fired combustor can take on many different configurations with the combustor of FIG. 1 being just one example configuration. In one example, the fuel-fired combustor is activated to regenerate a particulate filter PF as known; however, the fuel-fired combustor could be utilized with other types of exhaust components.

In the example shown, fuel-fired combustor 10 includes a housing 12 defining an internal cavity 14 that receives a combustion chamber 16. An inlet pipe 18 defines an exhaust gas inlet port 20 that directs exhaust gases from a vehicle engine into the internal cavity 14. The combustion chamber 16 includes a plurality of gas inlet openings 22 that direct exhaust gases into an interior of the combustion chamber 16. As such, when an ignition flame is present within the combustion chamber 16, the ignition flame is protected from full exhaust gas flow from the engine but a controlled amount of exhaust gas is still permitted to enter the combustion chamber 16 to provide oxygen to facilitate combustion. Exhaust gas not entering the combustion chamber 16 is directed through openings 24 formed within a shroud 26, which is mounted in the internal cavity 14. The shroud 26 then directs the exhaust gases to an outlet 28 of the housing 12. The exhaust gases exit the outlet 28 and then enter a downstream exhaust component.

The combustor 10 also includes an igniter 30. During a regeneration cycle or when an increase in internal exhaust gas temperatures is needed, the igniter 30 is activated. In one example, the igniter 30 comprises a pair of electrodes 32, the operation of which is controlled by the control system 100. When power is applied to the electrodes 32, a spark is generated in a gap 34 between the electrodes 32.

Fuel enters the combustor 10 through a fuel inlet nozzle 36 that is supplied by a fuel line 38. The fuel is advanced through the gap 34, which causes the fuel to be ignited by the spark produced by the igniter 30, which then produces a flame. Fuel entering the fuel nozzle 36 is generally in the form of a controlled fuel/air mixture; however, only fuel may be supplied in certain configurations.

In one example, the combustor 10 also includes a combustion air inlet 40 which directs pressurized air from an air source into the combustion chamber 16. During regeneration, a flow of air is introduced through the inlet 40 to provide oxygen (in addition to oxygen present in the exhaust gas) to sustain combustion of the fuel.

Figure 2:
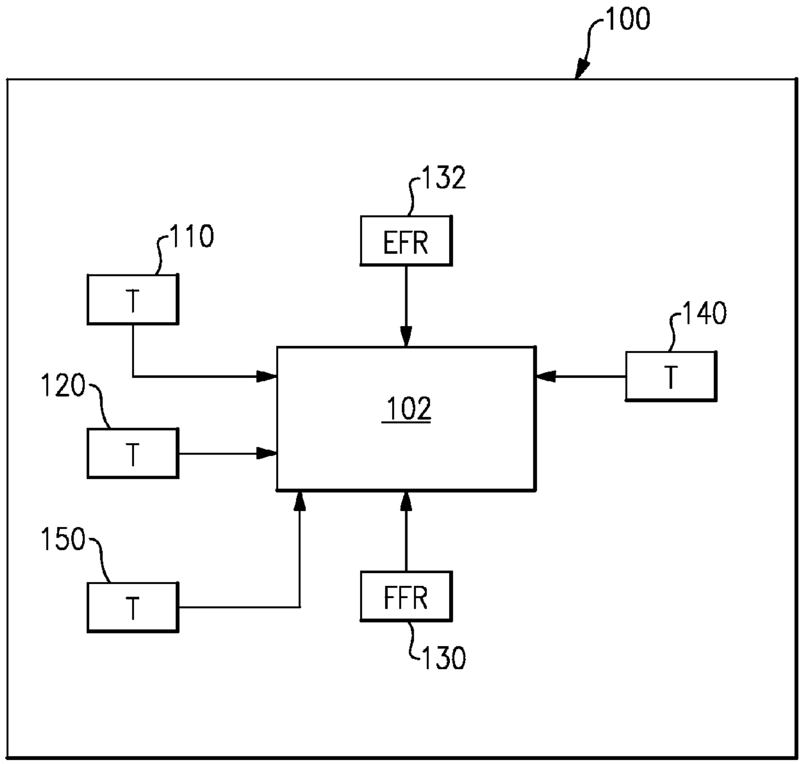
FIG. 2 shows a schematic view of the control system.

The control system 100 for the fuel-fired burner is shown in greater detail in FIG. 2. The control system 100 includes a plurality of sensors that measure and/or monitor various combustor characteristics. The sensors communicate these measurements to a system controller 102, which compiles and analyzes data, compares the data to certain predetermined combustor criteria, and subsequently generates an output signal to control, adjust, and/or change various system parameters or operating conditions to achieve a desired combustor performance. The controller 102 can comprise a single electronic control unit (ECU), one or more microcontrollers/microprocessors in communication with each other, or any combination of control elements that cooperate with each other to control operation of the combustor 10. The controller 102 is programmed with appropriate software and algorithms, and includes memory such that the various operations described below can be accomplished.

In one example, the control system 100 includes a temperature sensor 110 that measures a temperature of exhaust gas flow near the inlet pipe 18. The sensor 110 generates an inlet exhaust gas temperature signal which is communicated to the controller 102. The controller 102 compares this measured temperature to a normal operating temperature. The normal operating temperature comprises a predetermined combustor criteria that is stored within memory in the controller 102. When the inlet exhaust gas temperature exceeds the normal operating temperature, it is an indication of a potential system failure. For example, an increase in temperature of the inlet exhaust gas over normal operation temperatures at the inlet pipe 18 can be an indication of a broken or disconnected inlet pipe 18. If the inlet pipe 18 becomes damaged or detaches from the housing 12, an uncontrolled flame could be exposed to the ambient environment via the inlet, which could result in damage to surrounding components. When the controller 102 identifies this temperature increase at the inlet, an outlet signal is generated to deactivate operation of the combustor 10.

In another example, a sensor 120 is mounted external to the housing 12 to detect whether a flame has been exposed to the external environment. If the combustor 10 is damaged or somehow fails, allowing the flame to become exposed, the sensor 120 can detect this exposure and the controller 102 can deactivate operation of the combustor. The sensor can be comprised of one or more of an ultraviolet (UV) sensor, optical (visible spectrum) sensor, or infrared (IR) sensor for example.

In another example, a fuel flow rate sensor 130 is used to measure and monitor fuel flow from the fuel nozzle 36. The fuel flow rate is set by the controller 102 somewhere in a fuel flow rate range between a minimum allowable fuel flow rate and a maximum allowable fuel flow rate for a specified engine operating condition, with the set value depending upon an exhaust flow rate through the combustor 10. Once a presence of the flame is identified during regeneration, the controller 102 sets the fuel flow rate at a value within the fuel flow range dependent upon a current engine operating condition.

An exhaust gas flow rate sensor 132 measures the exhaust flow rate through the combustor 10. The controller 102 increases the fuel flow rate to a higher level within the fuel flow rate range when the exhaust gas flow rate is within a low operating range, and decreases the fuel flow rate to a lower level within the fuel flow rate range when the exhaust gas flow rate is within a higher operating range. For example, if the exhaust flow rate is low such as 10 g/s for example, the fuel rate could be set in approximately a middle of the fuel flow rate range, i.e. approximately 50% of the way between the minimum and maximum allowable fuel flow rates for the identified engine operating condition. If the exhaust flow rate is at a higher level such as at 200 g/s for example, the fuel rate could be set a lower level, such as within 20% of the minimum allowable fuel flow rate. This allows the controller 102 to provide just the right amount, i.e. an optimum amount, of fuel to allow the flame to be ramped up to the set-point.

In another example, an ambient temperature sensor 140 measures and monitors an external ambient temperature. The temperature of the fuel is directly related to the size of the droplets generated during atomization. The colder the fuel is, the bigger the droplets are. Bigger droplets are more difficult to ignite. Further, the colder the exhaust gas is flowing into the combustor 10, the more fuel it takes to achieve a common set-point temperature. In order to address these issues, the controller 102 provides an increased amount of fuel to the combustor 10. During the flame detection process, when there is no flame present, the controller operates with open-loop fueling. The controller 102 increases fuel flow as the ambient temperature decreases. A predetermined nominal temperature is set as the predetermined combustor criteria to define a temperature at which no adjustment is required. For example, the nominal temperature could be set at 25 degrees Celsius. Once the flame is detected, the controller 102 switches to closed-loop fuel control. The fuel flow rate is then determined based on ambient temperature sensor feedback and the predetermined set-point temperature. The upper limit of how much fuel is allowed to be delivered to the combustor 10 is a function of the ambient temperature. As the ambient temperature becomes colder, the upper limit on fuel flow is accordingly increased.

In another example, a temperature sensor 150 (see FIG. 1) is used to measure and monitor a temperature of the flame. Once the flame is detected, it is important to ensure that the flame is maintained active during the entire fueling cycle. If the flame is extinguished unexpectedly, gaseous emissions could increase significantly which would be undesirable. The temperature sensor 150 is placed within the flame to detect the loss of the flame. A predetermined combustor criteria is set to comprise a maximum temperature measured while the combustor is deactivated (the flame is not burning). If the temperature measurement is above the maximum temperature measured during deactivation, then the flame is present. If the temperature sensor measures a temperature below the predetermined combustor criteria, the controller 102 can then uses a slope of a compilation of measured temperatures over time. The controller 102 determines this slope based on the measured temperatures over time and identifies an absence of the flame when the slope is negative (trending downward) for a predetermined amount of time. The algorithm of the controller 102 monitors and determines an overall trend of the flame temperature such that even if the temperature increases briefly, the flame will be detected as being lost if the temperature is generally decreasing over time.

If the flame is lost immediately after it has been detected an alternate detection method can be utilized. If a measured flame temperature is less than a temperature of the gas entering the combustor 10 over a period of time, the flame has been lost.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel-fired combustor comprising:

a housing defining an internal cavity to provide a combustion chamber, said housing having an inlet to direct exhaust gas flow into said internal cavity and an outlet to direct exhaust gas flow into a downstream exhaust component;

a fuel inlet to supply fuel to said combustion chamber;

an igniter to ignite a mixture of exhaust gas and fuel to produce a flame for increasing an internal temperature;

at least one sensor measuring at least one combustor characteristic and generating a corresponding combustor characteristic signal, and wherein said at least one sensor comprises a temperature sensor that measures a temperature of exhaust gas flow near said inlet, and wherein said combustor characteristic signal comprises an inlet exhaust gas temperature; and a controller that receives said combustor characteristic signal, compares said combustor characteristic signal to a predetermined combustor criteria and generates an output signal to change at least one combustor operating condition if the combustor characteristic signal varies from said predetermined combustor criteria, and wherein said predetermined combustor criteria comprises a normal operating temperature, and when said inlet exhaust gas temperature exceeds said normal operating temperature an indication of a malfunctioning inlet pipe is provided, and said outlet signal comprises a deactivation signal.

2. A fuel-fired combustor comprising:

a housing defining an internal cavity to provide a combustion chamber, said housing having an inlet to direct exhaust gas flow into said internal cavity and an outlet to direct exhaust gas flow into a downstream exhaust component;

a fuel inlet to supply fuel to said combustion chamber;

an igniter to ignite a mixture of exhaust gas and fuel to produce a flame for increasing an internal temperature;

at least one sensor measuring at least one combustor characteristic and generating a corresponding combustor characteristic signal, wherein said at least one sensor is mounted external to said housing and comprises a flame detection sensor that detects when said flame is exposed to an ambient environment;

a controller that receives said combustor characteristic signal, compares said combustor characteristic signal to a predetermined combustor criteria and generates an output signal to change at least one combustor operating condition if the combustor characteristic signal varies from said predetermined combustor criteria; and wherein said combustor characteristic signal comprises an absence or presence of an exposed flame, and wherein said predetermined combustor criteria comprises an exposed flame, and wherein when said combustor characteristic signal comprises the presence of an exposed flame said output signal comprises a deactivation signal.

3. A fuel-fired combustor comprising:

a housing defining an internal cavity to provide a combustion chamber, said housing having an inlet to direct exhaust gas flow into said internal cavity and an outlet to direct exhaust gas flow into a downstream exhaust component;

a fuel inlet to supply fuel to said combustion chamber;

an igniter to ignite a mixture of exhaust gas and fuel to produce a flame for increasing an internal temperature;

at least one sensor measuring at least one combustor characteristic and generating a corresponding combustor characteristic signal, and wherein said at least one sensor comprises a fuel flow rate sensor and said combustor characteristic signal comprises a fuel flow rate; and a controller that receives said combustor characteristic signal, compares said combustor characteristic signal to a predetermined combustor criteria and generates an output signal to change at least one combustor operating condition if the combustor characteristic signal varies from said predetermined combustor criteria, and wherein said predetermined combustor criteria comprises a fuel flow range defined between a minimum allowable fuel flow rate and a maximum allowable fuel flow rate, and wherein once a presence of said flame is identified, said controller sets said fuel flow rate at a value within said fuel flow range dependent upon a current engine operating condition.

4. A fuel-fired combustor comprising:

a housing defining an internal cavity to provide a combustion chamber, said housing having an inlet to direct exhaust gas flow into said internal cavity and an outlet to direct exhaust gas flow into a downstream exhaust component;

a fuel inlet to supply fuel to said combustion chamber;

an igniter to ignite a mixture of exhaust gas and fuel to produce a flame for increasing an internal temperature;

at least one sensor measuring at least one combustor characteristic and generating a corresponding combustor characteristic signal, and wherein said at least one sensor comprises at least an ambient temperature sensor, and said combustor characteristic signal comprises an ambient temperature; and a controller that receives said combustor characteristic signal, compares said combustor characteristic signal to a predetermined combustor criteria and generates an output signal to change at least one combustor operating condition if the combustor characteristic signal varies from said predetermined combustor criteria, and wherein said predetermined combustor criteria comprises a nominal temperature, and wherein said controller provides open-loop fueling by increasing fuel flow as the ambient temperature decreases below said nominal temperature and wherein controller does not adjust fuel flow when said ambient temperature is at said nominal temperature.

5. A fuel-fired combustor comprising:

a housing defining an internal cavity to provide a combustion chamber, said housing having an inlet to direct exhaust gas flow into said internal cavity and an outlet to direct exhaust gas flow into a downstream exhaust component;

a fuel inlet to supply fuel to said combustion chamber;

an igniter to ignite a mixture of exhaust gas and fuel to produce a flame for increasing an internal temperature;

at least one sensor measuring at least one combustor characteristic and generating a corresponding combustor characteristic signal, and wherein said at least one sensor comprises a temperature sensor that measures a temperature of said flame; and a controller that receives said combustor characteristic signal, compares said combustor characteristic signal to a predetermined combustor criteria and generates an output signal to change at least one combustor operating condition if the combustor characteristic signal varies from said predetermined combustor criteria, and wherein said predetermined combustor criteria comprises a maximum temperature measured while the combustor is deactivated, and wherein said controller identifies a presence of said flame when said temperatures sensor measure a temperature that exceeds said predetermined combustor criteria.

6. A fuel-fired combustor comprising:

a housing defining an internal cavity;

a combustion chamber positioned within said internal cavity;

an inlet pipe connected to said housing to direct exhaust gas flow into said internal cavity;

a fuel inlet supply fuel to said combustion chamber;

an air inlet to supply air to mix with said fuel within said combustion chamber;

an igniter to ignite an air fuel mixture to produce a flame for increasing an internal temperature to a set-point;

at least one sensor measuring at least one combustor characteristic and generating a corresponding combustor characteristic signal, and wherein said at least one sensor comprises a temperature sensor that measures a temperature of exhaust gas flow near said inlet pipe, and wherein said combustor characteristic signal comprises an inlet exhaust gas temperature; and a controller that receives said combustor characteristic signal, compares said combustor characteristic signal to a predetermined combustor criteria and generates an output signal if the combustor characteristic signal varies from said predetermined combustor criteria, and wherein said predetermined combustor criteria comprises a normal operating temperature, and when said inlet exhaust gas temperature exceeds said normal operating temperature an indication of a malfunctioning inlet pipe is provided, and said outlet signal comprises a deactivation signal.

7. A fuel-fired combustor comprising:

a housing defining an internal cavity;

a combustion chamber positioned within said internal cavity;

an inlet pipe connected to said housing to direct exhaust gas flow into said internal cavity;

a fuel inlet to supply fuel to said combustion chamber;

an air inlet to supply air to mix with said fuel within said combustion chamber;

an igniter to ignite an air fuel mixture to produce a flame for increasing an internal temperature to a set-point;

at least one sensor measuring at least one combustor characteristic and generating a corresponding combustor characteristic signal, and wherein said at least one sensor is mounted external to said housing and comprises a flame detection sensor that detects when said flame is exposed to an ambient environment; and a controller that receives said combustor characteristic signal, compares said combustor characteristic signal to a predetermined combustor criteria and generates an output signal if the combustor characteristic signal varies from said predetermined combustor criteria, and wherein said combustor characteristic signal comprises an absence or presence of an exposed flame, and wherein said predetermined combustor criteria comprises an exposed flame, and wherein when said combustor characteristic signal comprises the presence of an exposed flame said output signal comprises a deactivation signal.

8. The fuel-fired combustor according to claim 7 wherein said flame detection sensor comprises one or more of an ultraviolet sensor, optical sensor, or infrared sensor.

9. A fuel-fired combustor comprising:

a housing defining an internal cavity;

a combustion chamber positioned within said internal cavity;

an inlet pipe connected to said housing to direct exhaust gas flow into said internal cavity;

a fuel inlet to supply fuel to said combustion chamber;

an air inlet to supply air to mix with said fuel within said combustion chamber;

an igniter to ignite an air fuel mixture to produce a flame for increasing an internal temperature to a set-point;

at least one sensor measuring at least one combustor characteristic and generating a corresponding combustor characteristic signal, and wherein said at least one sensor comprises a fuel flow rate sensor, and wherein said combustor characteristic signal comprises a fuel flow rate; and a controller that receives said combustor characteristic signal, compares said combustor characteristic signal to a predetermined combustor criteria and generates an output signal if the combustor characteristic signal varies from said predetermined combustor criteria, and wherein said predetermined combustor criteria comprises a fuel flow range defined between a minimum allowable fuel flow rate and a maximum allowable fuel flow rate, and wherein once a presence of said flame is identified, said controller sets said fuel flow rate at a value within said fuel flow range dependent upon a current engine operating condition.

10. The fuel-fired combustor according to claim 9 including an exhaust gas flow rate sensor that measures an exhaust gas flow rate through said combustor, and wherein said controller increases said fuel flow rate to a higher level within said fuel flow rate range when said exhaust gas flow rate is within a low operating range and wherein said controller decreases said fuel flow rate to a lower level within said fuel flow rate range when said exhaust gas flow rate is within a higher operating range.

11. A fuel-fired combustor comprising:

a housing defining an internal cavity;

a combustion chamber positioned within said internal cavity;

an inlet pipe connected to said housing to direct exhaust gas flow into said internal cavity;

a fuel inlet to supply fuel to said combustion chamber;

an air inlet to supply air to mix with said fuel within said combustion chamber;

an igniter to ignite an air fuel mixture to produce a flame for increasing an internal temperature to a set-point;

at least one sensor measuring at least one combustor characteristic and generating a corresponding combustor characteristic signal, and wherein said at least one sensor comprises at least an ambient temperature sensor, and wherein said combustor characteristic signal comprises an ambient temperature; and a controller that receives said combustor characteristic signal, compares said combustor characteristic signal to a predetermined combustor criteria and generates an output signal if the combustor characteristic signal varies from said predetermined combustor criteria, and wherein said predetermined combustor criteria comprises a normal temperature, and wherein said controller provides open-loop fueling by increasing fuel flow as the ambient temperature decreases below said nominal temperature and wherein controller does not adjust fuel flow when said ambient temperature is at said nominal temperature.

12. The fuel-fired combustor according to claim 11 wherein said controller provides closed-loop fueling once said flame is detected by adjusting fuel flow dependent upon temperature sensor feedback and an identified set-point temperature, and wherein the controller increases an upper limit of fuel flow rate as the ambient temperature drops below the nominal temperature.

13. A fuel-fired combustor comprising:

a housing defining an internal cavity;

a combustion chamber positioned within said internal cavity;

an inlet pipe connected to said housing to direct exhaust gas flow into said internal cavity;

a fuel inlet to supply fuel to said combustion chamber;

an air inlet to supply air to mix with said fuel within said combustion chamber;

an igniter to ignite an air fuel mixture to produce a flame for increasing an internal temperature to a set-point;

at least one sensor measuring at least one combustor characteristic and generating a corresponding combustor characteristic signal, and wherein said at least one sensor comprises a temperature sensor that measures a temperature of said flame; and a controller that receives said combustor characteristic signal, compares said combustor characteristic signal to a predetermined combustor criteria and generates an output signal if the combustor characteristic signal varies from said predetermined combustor criteria, and wherein said predetermined combustor criteria comprises a maximum temperature measured while the combustor is deactivated, and wherein said controller identifies a presence of said flame when said temperatures sensor measure a temperature that exceeds said predetermined combustor criteria.

14. The fuel-fired combustor according to claim 13 wherein when said temperature sensor measures a temperature below said predetermined combustor criteria, said controller determines a slope of measured temperatures over time and identifies an absence of said flame when said slope is trending negative for a predetermined amount of time.

15. The fuel-fired combustor according to claim 13 wherein said controller compares a measured flame temperature to a temperature of exhaust gas entering the combustor over a predetermined period of time, and wherein said controller identifies an absence of said flame when said measured flame temperatures are less than said temperature of said exhaust gas entering the combustor.

16. A fuel-fired combustor comprising:

a housing defining an internal cavity;

a combustion chamber positioned within said internal cavity;

an inlet pipe connected to said housing to direct exhaust as flow into said internal cavity, and wherein said housing is downstream of a vehicle engine such that said inlet pipe receives exhaust gases exiting a vehicle engine a fuel inlet to supply fuel to said combustion chamber;

an air inlet to supply air to mix with said fuel within said combustion chamber;

an igniter to ignite an air fuel mixture to produce a flame for increasing an internal temperature to a set-point, and wherein said flame is configured to increase a temperature of exhaust gases at least one sensor measuring at least one combustor characteristic and generating a corresponding combustor characteristic signal;

a controller that receives said combustor characteristic signal, compares said combustor characteristic signal to a predetermined combustor criteria and generates an output signal if the combustor characteristic signal varies from said predetermined combustor criteria; and wherein said housing includes an outlet that directs heated exhaust gases exiting said combustion chamber into a particulate filter.

17. A fuel-fired combustor comprising:

a housing defining an internal cavity;

a combustion chamber positioned within said internal cavity;

an inlet pipe connected to said housing to direct exhaust gas flow into said internal cavity, and wherein said combustion chamber comprises a wall that includes at least one gas inlet opening to direct exhaust gas exiting the inlet pipe into an interior of said combustion chamber;

a fuel inlet to supply fuel to said combustion chamber;

an air inlet to supply air to mix with said fuel within said combustion chamber;

an igniter to ignite an air fuel mixture to produce a flame for increasing an internal temperature to a set-point;

at least one sensor measuring at least one combustor characteristic and generating a corresponding combustor characteristic signal; and a controller that receives said combustor characteristic signal, compares said combustor characteristic signal to a predetermined combustor criteria and generates an output signal if the combustor characteristic signal varies from said predetermined combustor criteria.

18. The fuel-fired combustor according to claim 17 wherein said housing includes an outlet that directs heated exhaust gases exiting said combustion chamber into a downstream exhaust component, and including a shroud positioned upstream of said outlet and downstream of said combustion chamber, said shroud including at least one shroud opening to direct exhaust gas exiting said inlet pipe directly to said outlet.

19. A fuel-fired combustor comprising:

a housing defining an internal cavity to provide a combustion chamber, said housing having an inlet to direct exhaust gas flow into said internal cavity and an outlet to direct exhaust gas flow into a downstream exhaust component;

a fuel inlet to supply fuel to said combustion chamber;

an igniter to ignite a mixture of exhaust gas and fuel to produce a flame for increasing an internal temperature;

at least one sensor measuring at least one combustor characteristic and generating a corresponding combustor characteristic signal;

a controller that receives said combustor characteristic signal, compares said combustor characteristic signal to a predetermined combustor criteria and generates an output signal to change at least one combustor operating condition if the combustor characteristic signal varies from said predetermined combustor criteria; and wherein the inlet receives engine exhaust gases exiting a vehicle engine and directs the exhaust gases into said internal cavity downstream of the engine, and wherein said flame is configured to increase a temperature of exhaust gases, and wherein said housing includes an outlet that directs heated exhaust gases exiting said combustion chamber into a particulate filter.

20. A fuel-fired combustor comprising:

a housing defining an internal cavity to provide a combustion chamber, said housing having an inlet to direct exhaust gas flow into said internal cavity and an outlet to direct exhaust gas flow into a downstream exhaust component, and wherein said combustion chamber comprises a wall that includes at least one gas inlet opening to direct exhaust gas exiting said inlet pipe into an interior of said combustion chamber;

a fuel inlet to supply fuel to said combustion chamber;

an igniter to ignite a mixture of exhaust gas and fuel to produce a flame for increasing an internal temperature;

at least one sensor measuring at least one combustor characteristic and generating a corresponding combustor characteristic signal; and a controller that receives said combustor characteristic signal, compares said combustor characteristic signal to a predetermined combustor criteria and generates an output signal to change at least one combustor operating condition if the combustor characteristic signal varies from said predetermined combustor criteria.

21. The fuel-fired combustor according to claim 20 wherein said housing includes an outlet that directs heated exhaust gases exiting said combustion chamber into a downstream exhaust component, and including a shroud positioned upstream of said outlet and downstream of said combustion chamber, said shroud including at least one shroud opening to direct exhaust gas exiting said inlet pipe directly to said outlet.

22. A fuel-fired combustor comprising:

a housing defining an internal cavity to provide a combustion chamber, said housing having an inlet to direct exhaust gas flow into said internal cavity and an outlet to direct exhaust gas flow into a downstream exhaust component, and wherein said housing is downstream of a vehicle engine;

a fuel inlet to supply fuel to said combustion chamber;

an igniter to ignite a mixture of exhaust gas and fuel to produce a flame for increasing an internal temperature;

at least one sensor measuring at least one combustor characteristic and generating a corresponding combustor characteristic signal; and a controller that receives said combustor characteristic signal, compares said combustor characteristic signal to a predetermined combustor criteria and generates an output signal to change at least one combustor operating condition if the combustor characteristic signal varies from said predetermined combustor criteria.

* * * * *

UNITED STATES PATENT AND TRADEMARK OFFICE

CERTIFICATE OF CORRECTION

PATENT NO. : 8,881,718 B2
APPLICATION NO. : 12/849839
DATED : November 11, 2014
INVENTOR(S) : Tony Parrish It is certified that error appears in the above-identified patent and that said Letters Patent is hereby corrected as shown below:

IN THE CLAIMS:

In claim 11, column 9, line 30; delete "normal" and replace with --nominal--

Signed and Sealed this
Seventeenth Day of March, 2015

Michelle K. Lee
*Director of the United States Patent and Trademark Office*